(12) United States Patent
Xu et al.

(10) Patent No.: US 7,945,529 B2
(45) Date of Patent: May 17, 2011

(54) APPARATUS AND METHOD FOR PERFORMING TABLE COMPARISONS

(75) Inventors: Hui Xu, Cupertino, CA (US); Werner Daehn, Rheinland Pfalz (DE); Mon For Yee, San Francisco, CA (US); Ajit Dash, Sunnyvale, CA (US)

(73) Assignee: Business Objects, S.A., Levallois-Perret (FR)

( * ) Notice: Subject to any disclaimer, the term of this patent is extended or adjusted under 35 U.S.C. 154(b) by 431 days.

(21) Appl. No.: 11/965,351

(22) Filed: Dec. 27, 2007

(65) Prior Publication Data
US 2009/0171959 A1  Jul. 2, 2009

(51) Int. Cl.
*G06F 7/16* (2006.01)
(52) U.S. Cl. .................... 707/602; 707/752
(58) Field of Classification Search .................... 707/616
See application file for complete search history.

(56) References Cited

U.S. PATENT DOCUMENTS

| | | | |
|---|---|---|---|
| 4,611,280 A * | 9/1986 | Linderman | 712/300 |
| 4,873,625 A * | 10/1989 | Archer et al. | 1/1 |
| 5,121,494 A * | 6/1992 | Dias et al. | 1/1 |
| 5,355,505 A * | 10/1994 | Suzuki | 1/1 |
| 5,537,589 A * | 7/1996 | Dalal | 1/1 |
| 5,819,268 A * | 10/1998 | Hackett | 1/1 |
| 5,852,826 A * | 12/1998 | Graunke et al. | 1/1 |
| 5,873,001 A * | 2/1999 | Brinker et al. | 712/300 |
| 5,873,111 A * | 2/1999 | Edberg | 715/202 |
| 6,434,560 B1 * | 8/2002 | Case | 1/1 |
| 7,107,218 B1 * | 9/2006 | Preston | 704/270 |
| 7,356,526 B2 * | 4/2008 | Gao et al. | 1/1 |
| 7,536,432 B2 * | 5/2009 | Yamamoto | 709/201 |
| 2001/0047372 A1 * | 11/2001 | Gorelik et al. | 707/514 |
| 2005/0071331 A1 * | 3/2005 | Gao et al. | 707/4 |
| 2005/0144167 A1 * | 6/2005 | Yamamoto | 707/7 |
| 2005/0228808 A1 * | 10/2005 | Mamou et al. | 707/100 |
| 2007/0073645 A1 * | 3/2007 | Belyy et al. | 707/2 |
| 2007/0079140 A1 * | 4/2007 | Metzger et al. | 713/189 |
| 2008/0059449 A1 * | 3/2008 | Webster et al. | 707/5 |
| 2008/0104074 A1 * | 5/2008 | Lynch | 707/7 |
| 2008/0154844 A1 * | 6/2008 | Gao et al. | 707/2 |
| 2009/0063591 A1 * | 3/2009 | Betten et al. | 707/205 |

* cited by examiner

*Primary Examiner* — Charles Kim
*Assistant Examiner* — Hubert Cheung
(74) *Attorney, Agent, or Firm* — Mintz, Levin, Cohn, Ferris, Glovsky and Popeo, P.C.

(57) ABSTRACT

A computer readable storage medium includes executable instructions to analyze sort options associated with an input table and a comparison table. It is determined whether a consistent sort can be performed by a first database associated with the input table and a second database associated with the comparison table. A first sort operation is performed on the input table at the first database and a second sort operation is performed on the comparison table at the second database when a consistent sort can be achieved. Sort operations on the input table and the comparison table are executed at a common sort engine when a consistent sort cannot be performed by the first database and the second database.

10 Claims, 2 Drawing Sheets

APPARATUS AND METHOD FOR PERFORMING TABLE COMPARISONS

BRIEF DESCRIPTION OF THE INVENTION

This invention relates generally to the processing of digital data. More particularly, this invention relates to techniques for performing large table comparisons.

BACKGROUND OF THE INVENTION

A table comparison transform identifies differences between an input table and a comparison table. The differences are then updated in an output table. Differences are typically identified at the row level. For example, a row in the output table may be flagged with a label, such as INSERT, UPDATE or DELETE.

One table comparison method is a row-by-row select technique that applies a Structured Query Language (SQL) query to the comparison table for every input row from the input table. This option is advantageous when the comparison table is large compared to the number of rows in the input table.

With the cached comparison method, a comparison table is loaded into dynamic memory. In this case, queries to the comparison table access dynamic memory rather than the actual table. This technique is most successful when the comparison table fits into dynamic memory. Therefore, the technique does not scale and is otherwise unavailable for large comparison tables.

Another type of comparison method is based upon sorted input. With this technique, the comparison table is read in the order of the primary key columns. This approach is efficient because it requires only a single read of the comparison table. To exploit this technique, the order of the input data set must match the order of all primary key columns in the comparison table. In other words, the sorted information from the input table must match the sorted information from the comparison table. In addition, the comparison mechanism must be uniform. A problem may arise when an input table from a first database is sorted using a first technique, while a comparison table from a second database is sorted using a second technique. In such an event, the sort sequences may not be identical. Therefore, the resultant comparison operation may be erroneous. Similarly, if the databases use different comparison mechanisms, the comparison operation may be erroneous.

In view of the foregoing, it would be desirable to provide a technique to establish appropriate sorting of input table information and comparison table information to insure an accurate table comparison operation.

SUMMARY OF THE INVENTION

A computer readable storage medium includes executable instructions to analyze sort options associated with an input table and a comparison table. It is determined whether a consistent sort can be performed by a first database associated with the input table and a second database associated with the comparison table. A first sort operation is performed on the input table at the first database and a second sort operation is performed on the comparison table at the second database when a consistent sort can be achieved. Sort operations on the input table and the comparison table are executed at a common sort engine when a consistent sort cannot be performed by the first database and the second database.

A computer readable storage medium includes executable instructions to analyze sort options associated with an input table and a comparison table. It is determined whether a consistent sort can be performed by a first database associated with the input table and a second database associated with the comparison table. A first sort operation is performed on the input table at the first database and a second sort operation is performed on the comparison table at the second database when a consistent sort can be performed. Sort operations are divided between a common sort engine and one of the first database and the second database when a consistent sort cannot be performed.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
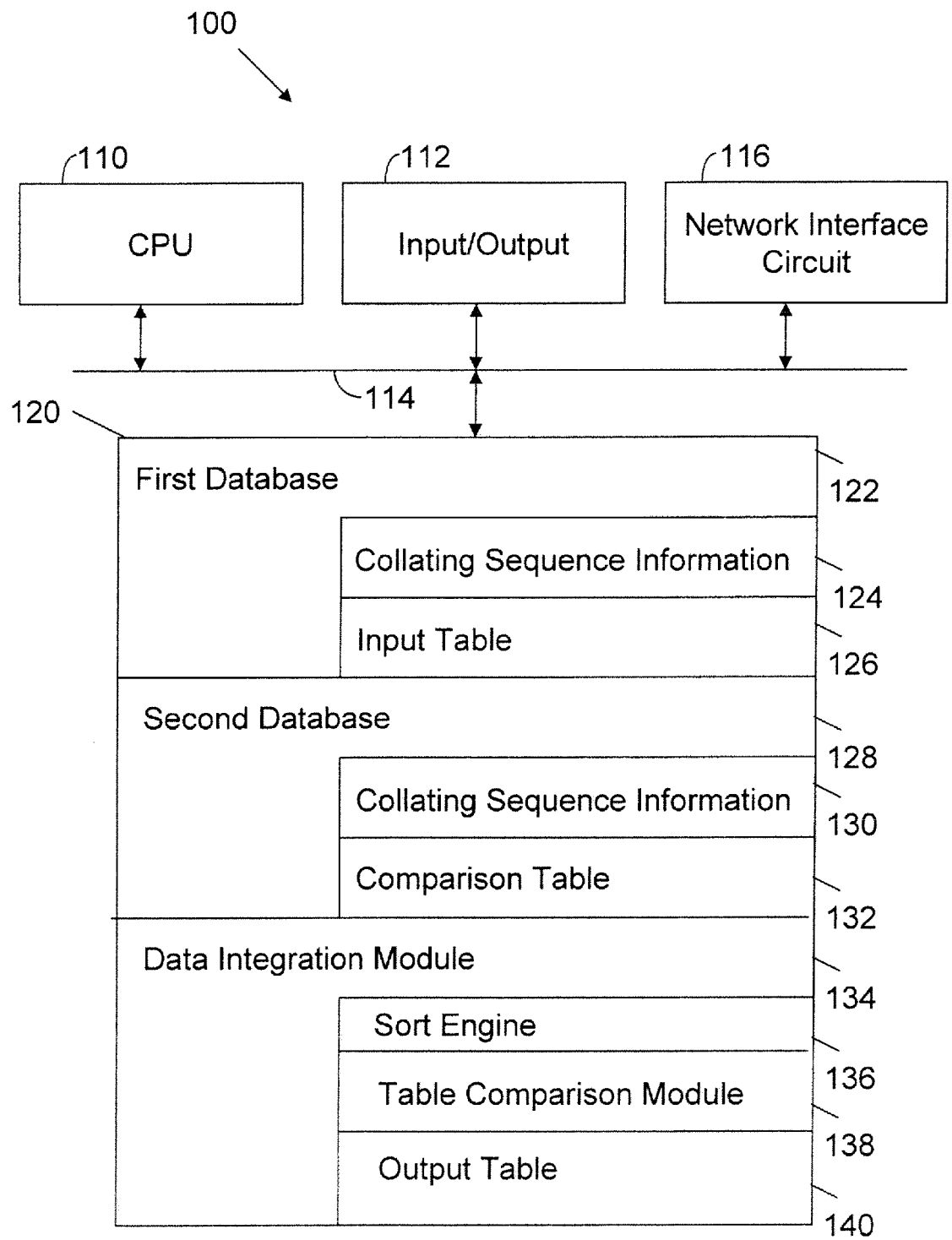
FIG. 1 illustrates a computer configured in accordance with an embodiment of the invention.

FIG. 1 illustrates a computer 100 configured in accordance with an embodiment of the invention. The computer 100 includes standard components, such as a central processing unit (CPU) 110 and input/output devices 112 connected via a bus 114. The input/output devices 112 may include a keyboard, mouse, display, printer and the like. A network interface circuit 116 is also connected to the bus 114 to allow connectivity to a network (not shown). Thus, the computer 100 may operate in a networked environment.

A memory 120 is also connected to the bus 114. In one embodiment, the memory 120 includes a first database 122, which includes collating sequence information 124. The collating sequence information provides data on how table information is sorted. By way of example, the collating sequence information may include numeric sort data, code page data, national language support data, character size encoding data, case sensitivity data, and customization options.

The numeric sort data specifies that a numeric sort is supported by the database. Most databases support numeric sorts and perform numeric sorts in an identical manner. If a numeric sort is not supported or if the form of the numeric sort is irregular, this information may be included in the numeric sort data.

Code page data is a set of information that specifies character encoding of database (e.g., table) information. For example, CP-1252 or Windows-1252, is a character encoding of the Latin alphabet used by default in legacy components of Microsoft® Windows®. American Standard Code for Information Interchange (ASCII) is a character encoding based on the English alphabet.

National language support data specifies which languages are supported by a database. The sorting sequence is related to the language supported. For example, the mechanism by which an Oracle® database sorts values for the ORDER BY clause is specified either explicitly by the NLS_SORT initialization parameter or implicitly by the NLS_LANGUAGE initialization parameter.

Character size encoding data specifies the byte size to encode data. If one database encodes characters with 8 bytes while a second database encodes characters with 16 bytes, different sort sequences may be generated.

Case sensitivity data specifies whether sort sequences are case sensitive. If one database is case sensitive while a second database is not case sensitive, different sort sequences may result.

Customization options specify what type of sort customization is available, if any. Some data sources provide multiple options for sorting sequences or allow the sorting sequence to be customized. The sort sequence may be set when a database is created. A sort sequence may also be set when the server definition for a data source is established. Alternately, the sort sequence may be set for a column when a table is created. Alternately, the sort sequence may be set with an ORDER BY clause in a SELECT statement. In accordance with an embodiment of the invention, database collating sequence information is retrieved from database catalog tables or by using an Application Program Interface (API) provided by the database.

The first database 122 also includes a set of tables, one of which is used as an input table 126 in a table comparison operation. The memory 120 also includes a second database 128 with collating sequence information 130, such as one or more of the collating sequence information discussed above. The second database 128 also includes a set of tables, one of which is used as a comparison table 132.

Memory 120 also includes a data integration module 134. In one embodiment, the data integration module 134 includes a sort engine 136. The sort engine 136 is invoked to provide a common sort for an input table 126 and a comparison table 132 under specified circumstances, as discussed below. The data integration module 134 also includes a table comparison module 136 to perform standard table comparison transform operations, which result in an output table 140.

The modules of memory 120 are exemplary. The modules may be combined in any number of ways. In addition, the modules may be distributed across a network; they need not reside in a single computer. It is the operations of the invention that are significant, not the precise manner or location at which those operations are performed.

Figure 2:
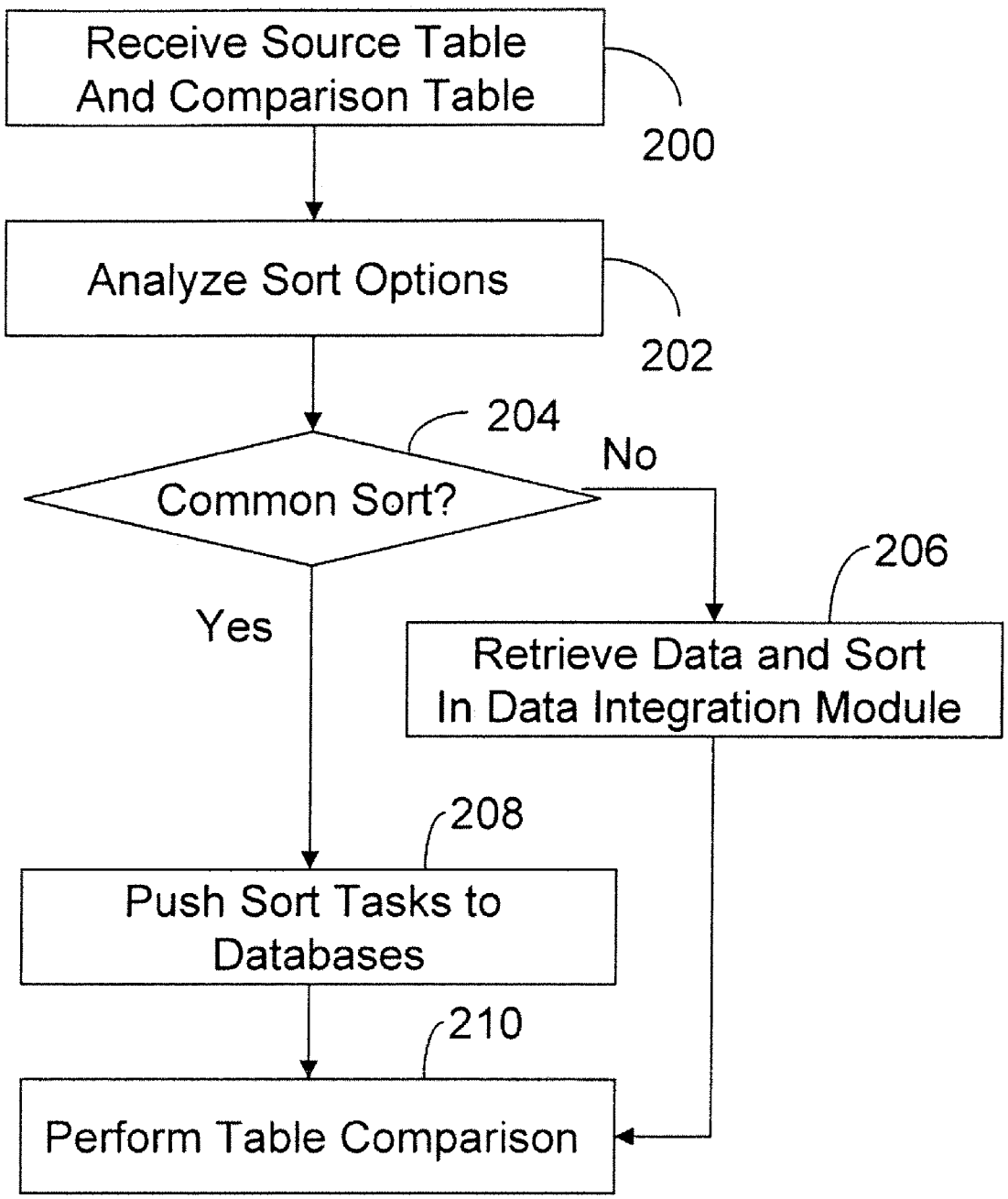
FIG. 2 illustrates processing operations associated with an embodiment of the invention.

FIG. 2 illustrates processing operations associated with the data integration module 134. Initially, the data integration module 134 receives a source table and a comparison table 200. For example, the source table may be input table 126 from the first database 122 and the comparison table may be comparison table 132 from the second database 128. The data integration module 134 then analyzes the sort options 202. In particular, the data integration module 134 analyzes the collating sequence information associated with the input table and the comparison table. For example, this may entail analyzing the collating sequence information 124 of the first database and the collating sequence information 130 of the second database.

It is then determined whether a common sort technique is available 204. In other words, it is determined whether the sorting of the input table by the first database will be consistent with the sorting of the comparison table by the second database. If so (204—YES), then the sort tasks are pushed to the underlying data sources to perform the sort operation 208. If not (204—NO), the data is retrieved by the data integration module 134 and is sorted 206. The sort engine 136 of the data integration module 134 may perform the sort operation. A table comparison operation is then performed 210. The table comparison transform module 138 of the data integration module 134 may be used for this operation. This produces the output table 140.

Thus, the data integration module 134 operates to insure that a proper sort order will be used prior to a table comparison transformation. If the sort operations can be imposed upon the underlying databases, the data integration module 134 pushes the sort tasks to those underlying databases for improved performance. If the sort operations cannot be performed by the underlying databases in a uniform manner, then the data integration module 134 performs the sort operation to insure proper sorting.

The invention has been fully disclosed. The following discussion highlights factors that may be considered while implementing the invention. In deciding whether a common sort is available, the data integration module 134 may examine the data type of the primary key. If the primary key is numeric, then the sort operation is preferably pushed to the underlying data sources since most data sources observe a common numeric sort order.

In examining code page data, the data integration module 134 determines whether the examined code pages have common attributes to support a consistent sort. If so, the data integration module 134 pushes the sort operations to the underlying data sources. For example, the data integration module 134 may read the code page by querying the NLS_DATABASE_PARAMETERS table. If the code page specifies a binary sort, then a binary sort is invoked at the database. If the code page is binary equivalent and the matching collation text for the order by clause is known, then the sort is invoked at the database.

Similarly, in examining the national language support data, the data integration module 134 determines whether the national language support data will allow for a consistent sort. If common languages are supported, the data integration module 134 may determine to allow the underlying data sources to perform the sort operations. If not, the data integration module may perform the sort operations.

Character size encoding data is analyzed in the same manner. If the character size encoding is the same, the underlying data sources may be utilized for the sort operations. Alternately, if the character size encoding is different but will lead to consistent results, the sort operations are performed by the underlying data sources. If the character size encoding precludes uniform sorts, then the sort engine 136 of the data integration module 134 is invoked.

If case sensitivity data indicates that consistent sort results can be secured, then the sort operations are applied at the underlying data sources. Otherwise, the sort engine 136 of the data integration module 134 is used.

The data integration module 134 may also analyze customization options. If the customization options associated with the underlying data sources allow for a uniform sort, then the data integration module 134 provides customization parameters to each underlying data source to insure proper sorting. For example, the data integration module may specify a BINARY sort order. Alternately, the data integration module 134 may enforce a common sort by specifying a collation statement, a sort parameter or a session parameter.

The invention may be implemented using all or a subset of the specified collating sequence information. Alternately, different collating sequence information may be processed in accordance with embodiments of the invention.

The invention may also be implemented by performing some of the sorting at an underlying database and other sorting at a common sort engine (e.g., 136). In other words, sort operations are divided between a common sort engine and one of the first database and the second database when a consistent sort cannot be performed. This divided approach is used to exploit the underlying computational power of a database when the sort engine has common sorting attributes with that database.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA® C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium, comprising executable instructions to:
   analyze sort options associated with an input table and a comparison table;
   determine whether a consistent sort can be performed by a first database associated with the input table and a second database associated with the comparison table;
   perform a first sort operation on the input table at the first database and a second sort operation on the comparison table at the second database when the consistent sort can be performed; and
   execute sort operations on the input table and the comparison table at a common sort engine when the consistent sort cannot be performed.

2. The non-transitory computer readable storage medium of claim 1 further comprising executable instructions to perform a table comparison of sorted values from the input table and the comparison table.

3. The non-transitory computer readable storage medium of claim 1 wherein the executable instructions to analyze the sort options include executable instructions to analyze numeric sort information associated with the first database and the second database.

4. The non-transitory computer readable storage medium of claim 1 wherein the executable instructions to analyze the sort options include executable instructions to analyze code page data associated with the first database and the second database.

5. The non-transitory computer readable storage medium of claim 1 wherein the executable instructions to analyze the sort options include executable instructions to analyze national language support data associated with the first database and the second database.

6. The non-transitory computer readable storage medium of claim 1 wherein the executable instructions to analyze the sort options include executable instructions to analyze character size encoding data associated with the first database and the second database.

7. The non-transitory computer readable storage medium of claim 1 wherein the executable instructions to analyze the sort options include executable instructions to analyze case sensitivity data associated with the first database and the second database.

8. The non-transitory computer readable storage medium of claim 1 wherein the executable instructions to analyze the sort options include executable instructions to analyze customization options associated with the first database and the second database.

9. The non-transitory computer readable storage medium of claim 1 wherein the executable instructions to analyze the sort options include executable instructions to analyze primary keys associated with the input table and the comparison table.

10. The non-transitory computer readable storage medium of claim 1 further comprising executable instructions to divide the sort operations between the common sort engine and one of the first database and the second database when the consistent sort cannot be performed.

* * * * *